United States Patent [19]

Maskrey et al.

[11] 4,207,031
[45] Jun. 10, 1980

[54] DUAL SPEED ROTARY VANE PUMP

[75] Inventors: Alfred E. Maskrey, Pittsburgh; Donald H. Hockenberry, Trafford, both of Pa.

[73] Assignee: Leybold-Heraeus GmbH & Co. KG, Cologne, Fed. Rep. of Germany

[21] Appl. No.: 891,403

[22] Filed: Mar. 29, 1978

[51] Int. Cl.² .................................... F04D 49/00
[52] U.S. Cl. ............................. 417/12; 417/87; 318/305; 318/306
[58] Field of Search .............. 417/12, 89, 152, 87; 318/305, 306

[56] References Cited

U.S. PATENT DOCUMENTS

| | | | |
|---|---|---|---|
| 2,690,291 | 9/1954 | Taylor | 417/12 X |
| 3,023,690 | 3/1962 | Long | 98/43 A X |
| 3,150,817 | 9/1969 | Jepsen et al. | 417/49 |
| 3,935,522 | 1/1976 | Tsay | 318/306 X |
| 4,085,594 | 4/1978 | Mayer | 318/306 |

FOREIGN PATENT DOCUMENTS 1931804  1/1970  Fed. Rep. of Germany ........... 318/305

Primary Examiner—Richard E. Gluck
Attorney, Agent, or Firm—Spencer & Kaye

[57] ABSTRACT

A dual speed mechanical rotary vacuum pump wherein a mechanical rotary vacuum pump is directly connected to a two speed electrical motor which drives the pump and the speed of the motor is controlled by an electrical control circuit which selectively causes the motor to rotate at either a first speed for a predetermined period of time or at a second slower speed. The speed of the motor is automatically switched to the slower speed after the predetermined period of time.

5 Claims, 2 Drawing Figures

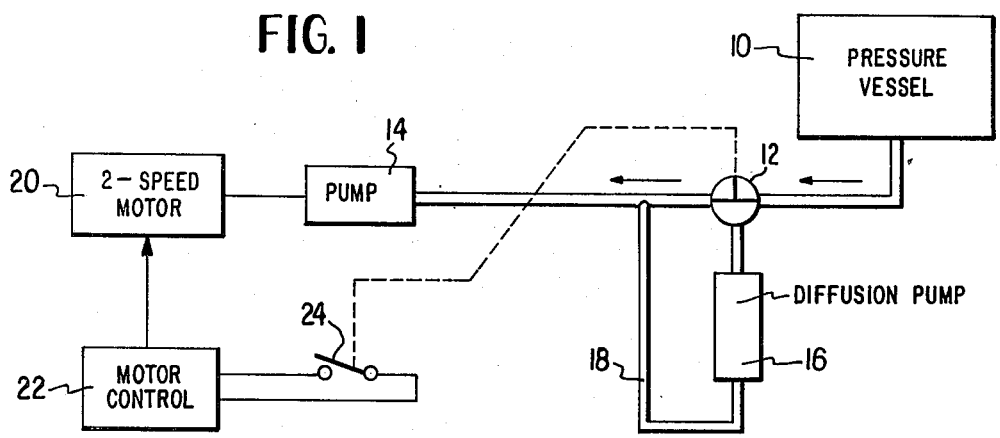
FIG. 1
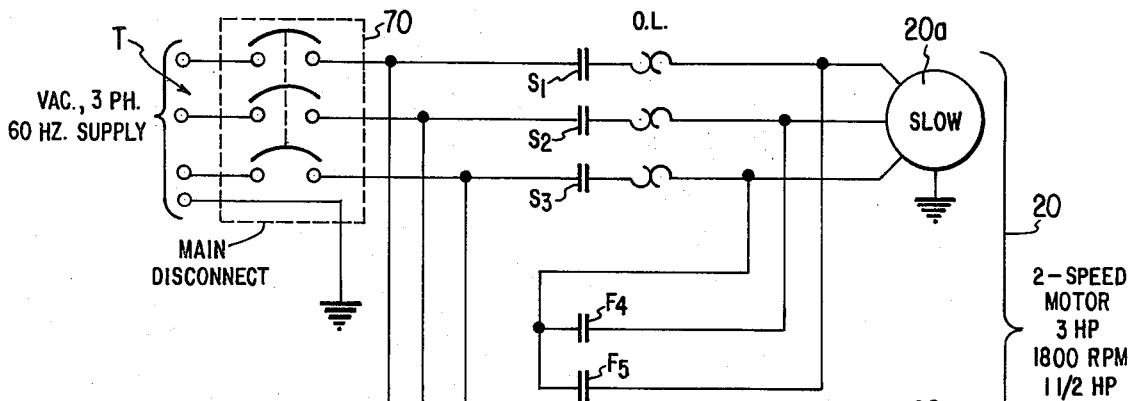
FIG. 2
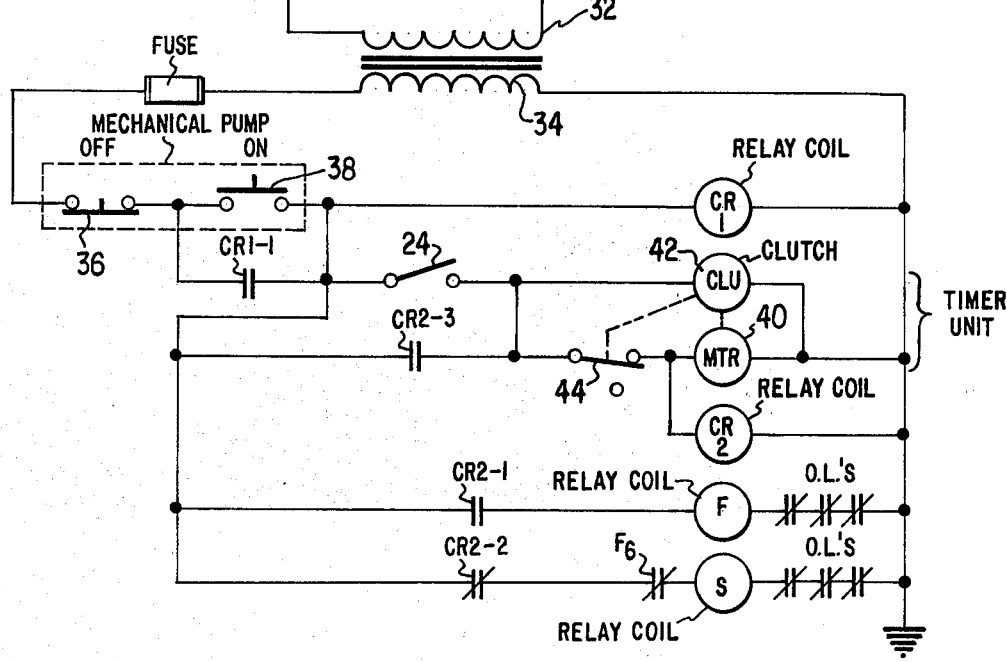

DUAL SPEED ROTARY VANE PUMP

BACKGROUND OF THE INVENTION

The present invention relates to a dual speed rotary mechanical vacuum pump. More particularly, the present invention relates to a rotary mechanical vacuum pump, for example, of the rotary vane type, which is connected to an electrical motor so that it can be selectively driven at either a high speed for roughing purposes or at a lower speed for backing a high vacuum type pump, for example, a diffusion or turbo pump.

In a typical high-vacuum system, a mechanical or roughing pump is initially connected to the chamber to be evacuated to pump same down from the atmospheric pressure to a pressure at which a high-vacuum pump, for example, a diffusion or turbo pump can operate. Thereafter further pumping down of the chamber is carried out by the high-vacuum pump. Optimally, the size of the roughing pump will be such as to provide a minimum desired pump down or roughing time. However, in such high-vacuum systems, as is well known to those skilled in the art, a further vacuum pump is required in order to provide back pressure for the high-vacuum pump, i.e., the diffusion or turbo pump, of the system. In order to provide this back pressure, either a further and separate mechanical pump may be provided or alternatively, for reasons of economy and space, the same single speed mechanical pump is used as both the roughing pump and as the backing pump. Historically when a single pump serves both of these functions, the size of the mechanical pump is a compromise between the optimum roughing speed and the required backing capacity and consequently the mechanical pump operates at a speed which is less than that required to provide the minimum roughing time but greater than that required to provide the desired backing capacity. Additionally, since in a conventional or typical vacuum process, such a mechanical vacuum pump would operate as a backing pump for a substantially greater period of its operating time, the use of such a single speed pump for both a roughing and a backing pump results in increased wear on the mechanical parts of the pump and increased power consumption, which obviously is a further disadvantage.

SUMMARY OF THE INVENTION

It is the primary object of the present invention to provide an arrangement wherein a single mechanical rotary vacuum pump may be utilized as both a roughing and as a backing pump but which overcomes the above discussed disadvantages.

The above object is basically achieved according to the present invention by providing a dual speed mechanical vacuum pump. In particular, according to the invention a mechanical rotary vacuum pump of the conventional type is directly connected to a two speed electrical motor which drives the pump, and an electrical control circuit arrangement is provided for connecting the motor to a source of electrical power in order to selectively cause the motor to rotate at either a first high speed for a predetermined period of time (the roughing time) or at a second lower speed, e.g. a speed sufficient to provide the desired backing capacity for a diffusion or turbo pump. Preferably the control arrangement is such that the speed of the motor will automatically switch to the second lower speed after having rotated at the first higher speed for the predetermined period of time.

According to the preferred mode of operation of the dual speed mechanical pump according to the invention, whenever the mechanical pump is turned on and the roughing valve, i.e., the valve which directly connects the input of the mechanical pump to the chamber to be evacuated, is open, the electric motor and hence the mechanical pump, is caused to rotate at the high speed for a predetermined period of time (which as will be explained below, is preferably slightly longer than the desired roughing time) and then is automatically caused to rotate at the lower speed to function as a backing pump for the high vacuum diffusion or turbo pump of the system.

BRIEF DESCRIPTION OF THE DRAWINGS

FIG. 1 is a simpled block diagram of a high vacuum system utilizing a dual speed mechanical vacuum pump according to the invention.

FIG. 2. is a schematic circuit diagram of a preferred embodiment of a control circuit for the electric motor of the dual speed mechanical vacuum pump according to the invention.

DETAILED DESCRIPTION OF THE PREFERRED EMBODIMENTS

Referring now to FIG. 1, there is shown a simplied block diagram of a typical high vacuum system incorporating a dual speed mechanical vacuum pump according to the invention, and wherein only the elements necessary for an understanding of the operation of the invention are shown. As shown in FIG. 1, the pressure vessel 10 is connected via a valving arrangement 12, i.e., a roughing valve, to either the inlet of a mechanical pump 14 or the high vacuum port of a diffusion or other type high vacuum pump 16. The fore port 18 of the pump 16 is likewise connected to the inlet of the mechanical pump 14 which may for example, be a model D 60A vane pump of Leybold Heraeus Vacuums Products Inc. The rotary mechanical pump 14 is directly coupled to and driven by a two speed electrical motor 20, whose speed is controlled by a motor control circuit 22. The motor 20 is a synchronous motor which operates for example, at a speed of 1800 RPM for roughing purposes and at 900 RPM for backing purposes. With a model D60A vane pump as mentioned above, this would result in a displacement of 55 cubic feet per minute (CFM) at the high speed of rotation, which would result in a decreased roughing time over that normally obtainable with this model pump, and a displacement of 27.5 CFM at the slow speed, which is adequate to back a 6" to 16" diffusion pump under most conditions.

In operation of the system shown in FIG. 1, upon opening of the roughing valve 12 so as to connect the input of the pump 14 directly to the pressure vessel or chamber 10, the motor control circuit 22 causes the motor 20 to operate at the fast speed, i.e., 1800 RPM in the specific example, for a predetermined period of time which is slightly longer than the roughing crossover point, i.e., the point at which the roughing valve 12 is closed so as to connect the high vacuum port of diffusion pump 16 to the chamber 10, and to connect the pump 14 as the backing pump for the diffusion pump 16. The reason for this greater length of time for the high speed operation, which should be at least a minute, is to enable the pump to handle the high gas load in the fore port 18 of the diffusion pump 16 as the system goes from rough to high vacuum. It should be noted that in a typical high vacuum system the opening and closing of the roughing valve 12 is carried out automatically in a manner well known to those skilled in the art and the apparatus for carrying out this function are therefore not shown in the drawing. An arrangement which may be used for this purpose is disclosed, for example, in U.S. Pat. No. 3,150,817, issued Sept. 29, 1964. However, in order to enable the motor control circuit 22 to know when the roughing valve is closed, and thus that the high speed operation of the pump 14 is desired, an electrical switch 24, which is controlled by the roughing valve 12 in a known manner, is provided so that the switch 24 is closed whenever the roughing valve is open to permit the pump 14 to function as a roughing pump.

Turning now to FIG. 2 there is shown a preferred embodiment of the motor control circuit 22 and its connections to the motor 20 in order to provide the desire dual speed operation of the pump 14 according to the invention. As shown in FIG. 2, the motor 20 is a three phase synchronous motor having two three phase windings, i.e., a three phase winding 20a for causing the motor to rotate at a slow speed (900 RPM in the illustrated example) and a three phase winding 20b for causing the motor to rotate at the fast speed (1800 RPM in the illustrated example). Each of the individual windings of the slow three phase winding 20a is connected via a respective thermo-overload protective device OL and a respective pair of normally open contacts $S_1$ to $S_3$ to the input terminals T for a three phase alternating current supply source, for example, 230 volts at 60 Hz. As shown, a conventional three phase main disconnect device or circuit breaker 70 is connected in series with the input terminals T. In a similar manner, each of the windings of the fast three phase winding 20b is connected to the three phase input terminals T via a respective thermal overload device OL and a respective pair of normally open contacts $F_1$ to $F_3$. Also connected to the individual windings of the slow three phase windings 20a is a network having a pair of normally open contacts $F_4$ and $F_5$ connected with only two of the three phase windings, which has the effect of shorting the three windings of the slow phase winding 20a when the contacts $F_4$ and $F_5$ are closed as will be explained below. Connected across two phases of the supply is the primary winding 32 of a step down transformer whose secondary winding 34 supplies the power for controlling the operation of the motor 20.

This circuit includes the series connection of a normally closed momentary off switch 36 and normally open momentary on switch 38 with which the remainder of the circuit is connected in series across the secondary winding 34 and which controls the basic supply of power thereto. The remainder of the circuit elements are in general connected in a plurality of parallelly connected branches which are each essentially connected in series with the switches 36 and 38. The first of these branches contains the relay coil of a control relay CR1 which controls a pair of normally open contacts CR1-1 connected in parallel with the on switch 38. Consequently, momentary closure of the on switch 38 will cause the relay coil of relay CR1 to be energized and close its normally open contacts CR1-1.

The second of these parallel branches contains the relay coil for the relay F, which controls the relay contacts $F_1$ to $F_5$ described above, and which is connected in series with a pair of normally open contacts CR2-1 of a relay CR2, while a third of these branches contains the relay coil for the relay S for controlling the contact $S_1$ to $S_3$, which is connected in series with a pair of normally closed contacts CR2-2 and a pair of normally closed contacts $F_6$. With the circuit thus far described, closure of the switch 38 will cause the relay coil S to be energized, closing the contacts $S_1$ to $S_3$, and causing the motor 20 to operate in the slow speed.

Finally, a further branch connected in series with the switches 36 and 38 contains the switch 24 for the roughing valve which is connected in series with a timer unit or time delay relay which may for example, be a model 321 time delay relay manufactured by Automatic Timing Controls, Inc. This timer unit includes a motor 40 which is mechanically connected via a normally non-energized clutch 42 to a normally closed timer switch 44. Connected in series with the timer switch 44 and thus controlled by same, is the relay coil of the control relay CR2.

In the operation of the complete circuit thus far described, and assuming that a complete vacuum process is to carried out, i.e., a roughing cycle followed by a high vacuum cycle, at the time that the on switch 38 is depressed, the roughing valve 12 of FIG. 1 will be open, and consequently the switch 24 will be closed. Momentary closure of the switch 38 causes the relay CR1 to be energized, closing the contacts CR1-1, so that power will be continuously supplied to the control circuit from the secondary winding 34 until such time as the off switch 36 is momentarily depressed. Closure of the on switch 38 will moreover cause the relay coil CR2 to be energized, via the closed switch 24 and the normally closed timer switch 44, and open the normally closed contacts CR2-2 and close the contacts CR2-1. Closure of the contacts CR2-1 will result in energization of the relay coil F which closes each of the normally open contacts $F_1$ to $F_5$ and opens the normally closed contacts $F_6$. Closure of the contacts $F_1$ and $F_3$ will cause the three phase fast winding 20b to be energized to cause the motor 20 to rotate at the fast speed. Simultaneously, closure of the contacts $F_4$ and $F_5$ will short out the three phase slow winding 20a, while opening of the contacts $F_6$ will ensure that the relay coil S is not energized during this period.

Closure of the on switch 38 will additionally cause the motor 40 and the clutch 42 to be energized. In a conventional time delay relay of this type, the clutch 42 normally drives a mechanical cam which will open the switch 44 after a predetermined period of time, for example, 15 minutes, which in any case must at least be as long as the desired roughing period. Upon opening of the switch 44 after the predetermined period of time, the relay coil CR2 will be deenergized, thus retaining the contacts CR2-1 and CR2-2 to the illustrated position. This will result in the relay coil F being deenergized (opening the contacts $F_1$ to $F_5$ and closing the contacts $F_6$) and the relay coil S being energized to close the contacts $S_1$ to $S_3$ causing the three phase slow speed winding 20a to be energized. Since the clutch 42 remains energized even after the switch 44 has opened, the switch 44 will not be reset to permit subsequent energization of the relay coil CR2 until such time as the switch 24 has opened indicating the end of the roughing period. Motor operation at the slow speed via the three phase winding 28 continues until such time as either the switch 36 is depressed, in which case the pump will be turned off, or until such time as the switch 24 is subsequently closed, in which case the sequence of fast speed operation for a predetermined period of time followed by slow speed operation will be repeated.

As indicated above, it is desirable for the high speed operation to continue for a period of time slightly longer than that required for the roughing period, and consequently the timer is set to produce such an extended period before opening the switch 44. Since as indicated above the roughing valve 12 will normally be automatically closed at the end of the desired roughing period, and hence the switch 24 will be open, in order to permit this extended period of operation of the timer motor 40 and clutch 42, an additional pair of normally open contacts CR2-3 are provided in parallel with the switch 24. These contacts, which will be closed upon energization of the relay coil CR2, will permit the motor 40 and clutch 42 to remain energized after opening of the switch 24 and until opening of the switch 44.

As can easily be appreciated, use of the dual speed mechanical rotary pump according to the invention provides the advantages of less energy consumption and longer service life of the pump at a relatively low cost when compared to prior art installations wherein either a single mechanical pump or separate mechanical pumps were used to provide the roughing and backing functions required in a high vacuum system.

It will be understood that the above description of the present invention is susceptible to various modifications, changes and adaptations, and the same are intended to be comprehended within the meaning and range of equivalents of the appended claims.

What is claimed is:

1. A dual speed vacuum pump comprising in combination:
   a mechanical rotary vacuum pump; input terminals for a source of electrical power; a two speed electrical motor directly connected to said pump for driving same, said motor having a first and a second plurality of windings which, when connected to said input terminals, cause said motor to rotate at a first speed and at a second speed respectively, with said second speed being lower than said first speed; and control circuit means for connecting said motor to said input terminals to cause said motor to rotate at said first speed for a predetermined period of time and at said second speed after said predetermined period of time, said control circuit means including: a first plurality of normally open switching contacts for connecting said first plurality of windings to said input terminals, a second plurality of normally open switching contacts for connecting said second plurality of windings to said input terminals, a first relay coil for closing said first plurality of normally open switching contacts when energized, a second relay coil for closing said second plurality of normally open switching contacts when energized, and timing means, responsive to an input signal to said control circuit means, for causing only said first relay coil to be energized for said predetermined period of time and for thereafter deenergizing said first relay coil and for energizing said second relay coil.

2. A dual speed vacuum pump as defined in claim 1 wherein said timing means includes: a timer having normally closed contacts which are opened at the end of said predetermined period of time; and a control relay having a relay coil which is connected in series with said contacts of said timer, a first set of normally open contacts connected in series with said first relay coil, and a set of normally closed contacts connected in series with said second relay coil.

3. A dual speed vacuum pump as defined in claim 2 wherein: said pump is to be used both as a roughing pump for a vacuum system during the roughing phase and as a backing pump for a diffusion or turbo pump for the vacuum system during the high vacuum phase; wherein said pump is connected to said vacuum system via a valve which is open when said pump is used as a roughing pump, and is closed when the roughing crossover point for the system is reached; and wherein an electrical switch is provided which is responsive to the position of the valve and is closed when the valve is open, said electrical switch being connected in series with said timing means to cause same to be energized when said switch is closed, whereby said vacuum pump rotates at said first speed during the roughing phase and at said second slower speed during the high vacuum phase.

4. A dual speed vacuum pump as defined in claim 3 wherein said predetermined period of time is slightly longer than the period of time required for the vacuum to reach the roughing crossover point, and wherein said control relay has a second set of normally open contacts connected in parallel with said switch.

5. In combination with a dual speed vacuum pump as defined in claim 1, a vessel which is to be evacuated; a diffusion pump; means for connecting the inlet of said dual speed vacuum pump to the fore port of said diffusion pump; valve means for selectively connecting the inlet of said dual speed vacuum pump and the high vacuum port of said diffusion pump to said vessel for evacuating same, said valve means having a first condition during the roughing phase of the evacuation of said vessel wherein said inlet of said dual speed vacuum pump is directly connected via said valve to said vessel so that said dual speed vacuum pump can function as a roughing pump and a second condition during the high vacuum phase of the evacuation of said vessel wherein said inlet of said dual pressure vacuum pump is disconnected from said vessel and only said high vacuum port of said diffusion pump is connected to said vessel whereby said dual speed vacuum pump can function as a backing pump for said diffusion pump; and an electrical switch responsive to the condition of said valve means and being in a closed condition when said valve means is in said first condition, said electrical switch being connected in series with said timing means and across a source of electrical potential so as to cause said timing means to be energized when said electrical switch is in a closed condition.

* * * * *